(12) United States Patent
Elliott

(10) Patent No.: US 8,359,582 B2
(45) Date of Patent: Jan. 22, 2013

(54) COMPILING AND INSERTING CODE SNIPPETS AT RUNTIME

(75) Inventor: Tavis Elliott, Bothell, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1076 days.

(21) Appl. No.: 12/239,745

(22) Filed: Sep. 27, 2008

(65) Prior Publication Data

US 2009/0172653 A1 Jul. 2, 2009

Related U.S. Application Data

(60) Provisional application No. 61/009,634, filed on Dec. 31, 2007.

(51) Int. Cl.
*G06F 9/45* (2006.01)

(52) U.S. Cl. ........ 717/130; 717/127; 717/131; 717/141; 717/143; 717/148

(58) Field of Classification Search ........................ None
See application file for complete search history.

(56) References Cited

U.S. PATENT DOCUMENTS

| | | |
|---|---|---|
| 6,415,434 B1 | 7/2002 | Kind |
| 6,546,551 B1 | 4/2003 | Sweeney et al. |
| 7,243,356 B1 | 7/2007 | Saulpaugh et al. |
| 7,281,242 B2 * | 10/2007 | Inamdar ........................ 717/158 |
| 7,818,721 B2 * | 10/2010 | Sundararajan et al. ....... 717/130 |
| 2005/0193369 A1 | 9/2005 | Brumme et al. |

\* cited by examiner

*Primary Examiner* — Chuck Kendall

(57) ABSTRACT

Method, computer readable medium, and system for specifying before-compiled code, compiling the before-compiled code into a compiled code snippet, specifying an insertion point in a compiled code block of a computer program, and inserting the compiled code snippet into the compiled code block at the specified insertion point while the computer program is running.

16 Claims, 2 Drawing Sheets

# COMPILING AND INSERTING CODE SNIPPETS AT RUNTIME

CROSS REFERENCE TO RELATED APPLICATIONS

This Application claims the benefit of U.S. provisional patent application Ser. No. 61/009,634, filed Dec. 31, 2007, titled "Compiling and Inserting Code Snippets at Runtime," which application is hereby incorporated by reference herein as if reproduced in full be low.

BACKGROUND

Typically it is not possible to modify a computer program, or a program class, while the program or class is running, i.e., during runtime. However, there are occasions when program modification during runtime is desirable.

For example, the performance of a computer system running an application, such as the performance of a networked system running an application written in the Java programming language, can be affected by many variables. In order to determine the operating condition of an application, a so-called "diagnostic probe" can be used. Such a probe can be used to monitor various aspects or operating parameters of the application as it runs, for example, to gather statistics regarding application operation. The probe can be written in the programming language of the application. In general, a diagnostic probe captures event information with regard to a running application as the events occur.

In connection with an application running on a network, such as one implemented in a Java-based environment such as Websphere, there may be many instances of Websphere in which the application runs. In order to monitor system performance, such as to identify the source of a performance problem, a diagnostic probe might be installed on the system as it is running to capture system events for analysis. A probe might be useful in gathering such data at runtime, for example, because the performance of a particular application method might vary based on the arguments that are passed to the method. However, something else in an object's immediate environment in the code, which the probe would not be able to detect, might also adversely affect its operation.

One common data capture approach using a probe is to capture timing information for an application method. Data regarding the start of the method, the end of the method, and the method's performance can be captured by the probe. However, the probe may not be able to detect everything about an object's environment. For example, a particular field in an object may have an effect on a method call involving that object that cannot be detected by the probe. That this can have an effect on the performance of the system that may not be revealed by the probe. Therefore, the information captured by the probe does not give a complete picture of the conditions affecting the operation of the method, and thus the performance of the system. What is needed is a way to capture such information, in order to better analyze and understand the factors affecting the performance of the method.

In the prior art, there are two approaches available to achieve this goal. Both approaches are problematic in that they consume significant development, testing, and maintenance resources. The first approach requires the development of many lines of Java code to implement the bytecode instrumentation necessary to use the application programming interface (API) of the application. Such instrumentation involves the addition of bytecodes to application methods for gathering data to be utilized by diagnostic tools. Examples of such tools include monitoring agents and event loggers.

In the second approach, many lines of Java code that uses the Java Reflection API could be developed, again requiring an investment of development, testing, and maintenance resources, and in addition incurring undesirable runtime performance overhead. Reflection is an API that represents ("reflects") the classes, interfaces, and objects in the current Java Virtual Machine (JVM). Reflection can be used by programs which require the ability to examine or modify the runtime behavior of applications running in the JVM. However, because reflection involves types that are dynamically resolved, certain JVM optimizations cannot be performed. Consequently, reflective operations can have slower performance than non-reflective operations.

In addition, reflection allows code to perform operations that would be illegal in non-reflective code, such as accessing private fields and methods. Therefore, the use of reflection can result in unexpected side-effects, which may render code dysfunctional and may also destroy portability. Reflective code can also break abstractions and therefore may change behavior with upgrades of the platform.

There is a need for a straightforward way to keep a data capture product up to date as applications and technology change, and that ameliorates the shortcomings of prior practices. More generally, it is desirable to provide a way to modify the operation of a program or application class during runtime.

SUMMARY

Provided are method, computer readable medium, and system for specifying before-compiled code, compiling the before-compiled code into a compiled code snippet, specifying an insertion point in a compiled code block, and inserting the compiled code snippet into the compiled code block at the specified insertion point during runtime.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Figure 1:
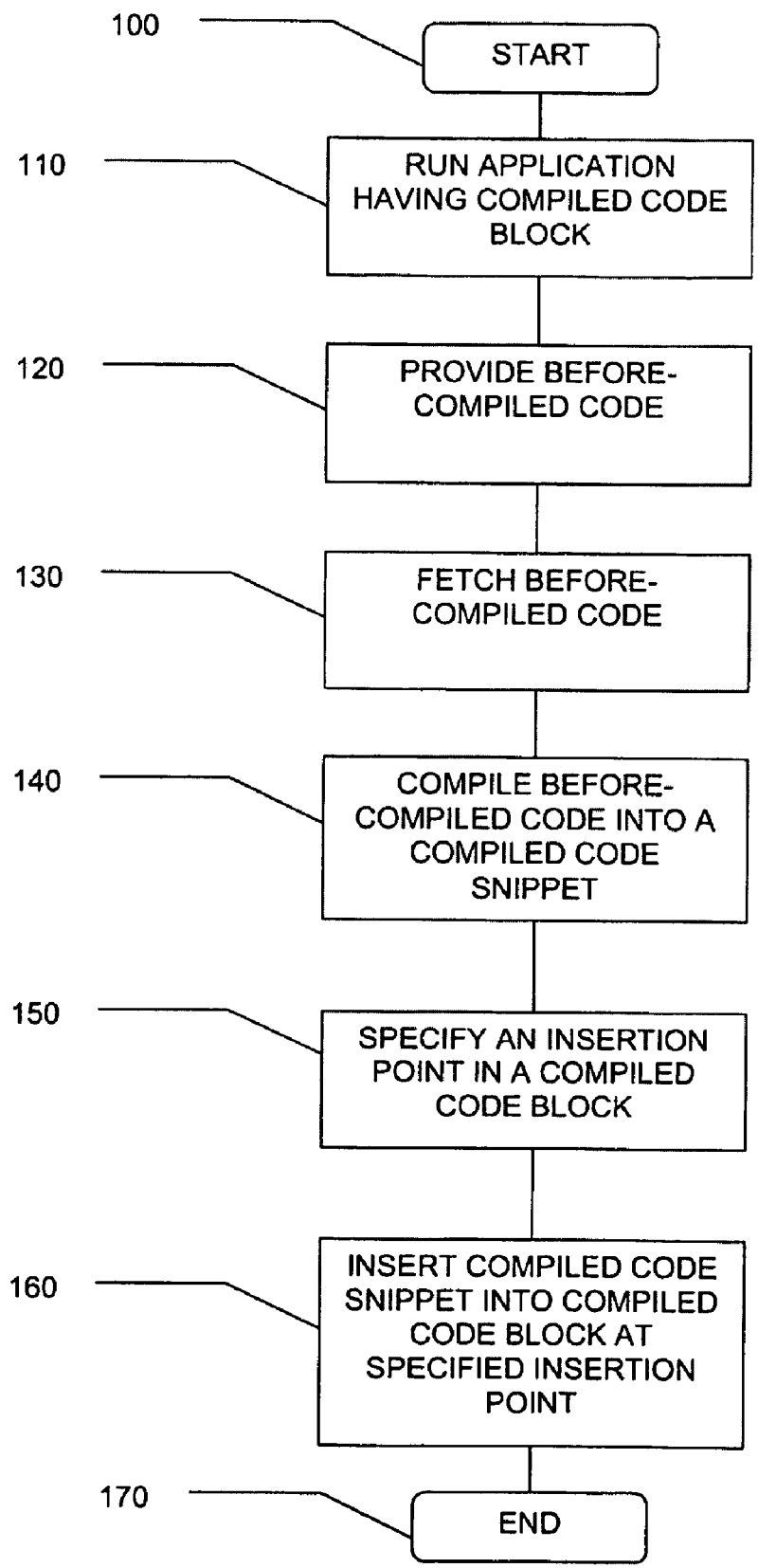
FIG. 1 is a block diagram showing a method of inserting a compiled code snippet into a compiled code block at a specified insertion point, in accordance with an illustrative implementation of the claimed invention.

An illustrative mechanism to add functionality to an application program or application class as the program is running is disclosed. The mechanism adds functionality by fetching code, herein designated a before-compiled code snippet, and compiling the before-compiled code snippet to generate a compiled code snippet. The compiled code snippet is then inserted into a block of compiled code at a specified location, herein designated the insertion point. Preferably, the compiled code snippet is inserted into the compiled code block as the code block is running, i.e., at runtime. Preferably, the before-compiled code snippet is also compiled at runtime, just prior to being inserted into the compiled code block, in a so-called just-in-time compiling action.

The location of the high level code of the before-compiled code snippet can be identified in a file, herein designated a configuration file. The configuration file can comprise the before-compiled code. Alternatively, the before-compiled code can exist at another location known to the configuration file, such as in a separate file whose filename and path are known to the configuration file, for example by being specified in the configuration file.

The file containing the before-compiled code can include only the before-compiled code being compiled, or it can include additional code as well. If additional code is included, the lines of code to be compiled can be specified in the configuration file. For example, the lines of code to be compiled can be specified by identifying a range of lines of code in the file, such as by specifying a first line and a last line of code, or by specifying a first line of code and a number of lines, or by specifying particular individual lines of code.

The before-compiled code is compiled in a compiler, in a manner known by those of skill in the art. The compiler can generate a select type of compiled code, such as bytecode, or other machine-readable code, such as native code. In an embodiment, the before-compiled code can comprise high-level code such as Java code, although other high-level code can be used.

The compiled code is inserted into the running application at a select location, herein designated the insertion point. The insertion point can be indicated, for example, by an indicator in the configuration file.

In an exemplary implementation, a user can put a few lines of Java code in a configuration file, to add desired functionality to an existing application or application class. An application, such as a probe, can fetch the Java code, compile the Java code to generate compiled Java code such as bytecode, insert the bytecode in into a bytecode block of the application class at an insertion point indicated in the configuration file, and thereby add the desired functionality to the class. Preferably, the code snippet can be compiled and inserted into the application class at runtime, thereby adding functionality to an already loaded application or application class. For example, the ability to capture select data can be added to an already loaded application or application class, such as the probe, at runtime.

In an exemplary implementation, a Java probe can be modified. A Java probe is an application that is configured to start in a user's Java-based application using modified configuration scripts. After the probe starts up it can instrument Java classes as they're loaded into the user's application. The probe can be modified in accordance with the configuration file by compiling a Java code snippet into bytecode, and inserting the code snippet bytecode into a block of compiled bytecode of a Java class as the class is loaded, or, after the class is loaded, in order to add new functionality to the probe. The point in the Java probe bytecode at which the compiled code snippet bytecode is inserted can be indicated in the configuration file. For example, the inserted bytecode can call back into the Java probe and enable capturing of data with regard to new types of performance events as they happen. Illustratively, the probe can then send the captured data back to a diagnostic server, which can aggregate, correlate, and perform any desired manipulation of the data, such as for display to the user.

In an embodiment, the configuration file can work in conjunction with another file, herein designated the points file. The points file comprises a list of definitions of what functions to instrument, and what to do to capture data at a desired point. In an exemplary implementation, the points file can indicate parameters, including but not limited to class name, method name, and signature, to specify how to instrument that particular class method, and what to do to capture data from that location.

Referring now to FIG. 1, shown is a block diagram illustrating a method of inserting a compiled code snippet into a compiled code block at a specified insertion point. The method starts (100) and proceeds to block 110, wherein an application or application class comprising a compiled code block is run. The compiled code may comprise bytecode, or it may comprise other compiled code, such as code that can readily be executed by a machine (a computer), e.g., native code. The compiled code may be being loaded, or may already be running. Before-compiled code is provided (120), such as in a configuration file, or in a file known to the configuration file. The before-compiled code is fetched (130), such as from a location indicated in the configuration file, either from the configuration file itself, or from a location indicated in the configuration file. The fetched before-compiled code is compiled into a compiled code snippet (140), using a compiler for example. An insertion point in a compiled code block of the application or application class is specified (150). The compiled code snippet is inserted into the compiled code block at the specified insertion point (160), thereby modifying the application of application class, and the method ends (170).

Figure 2:
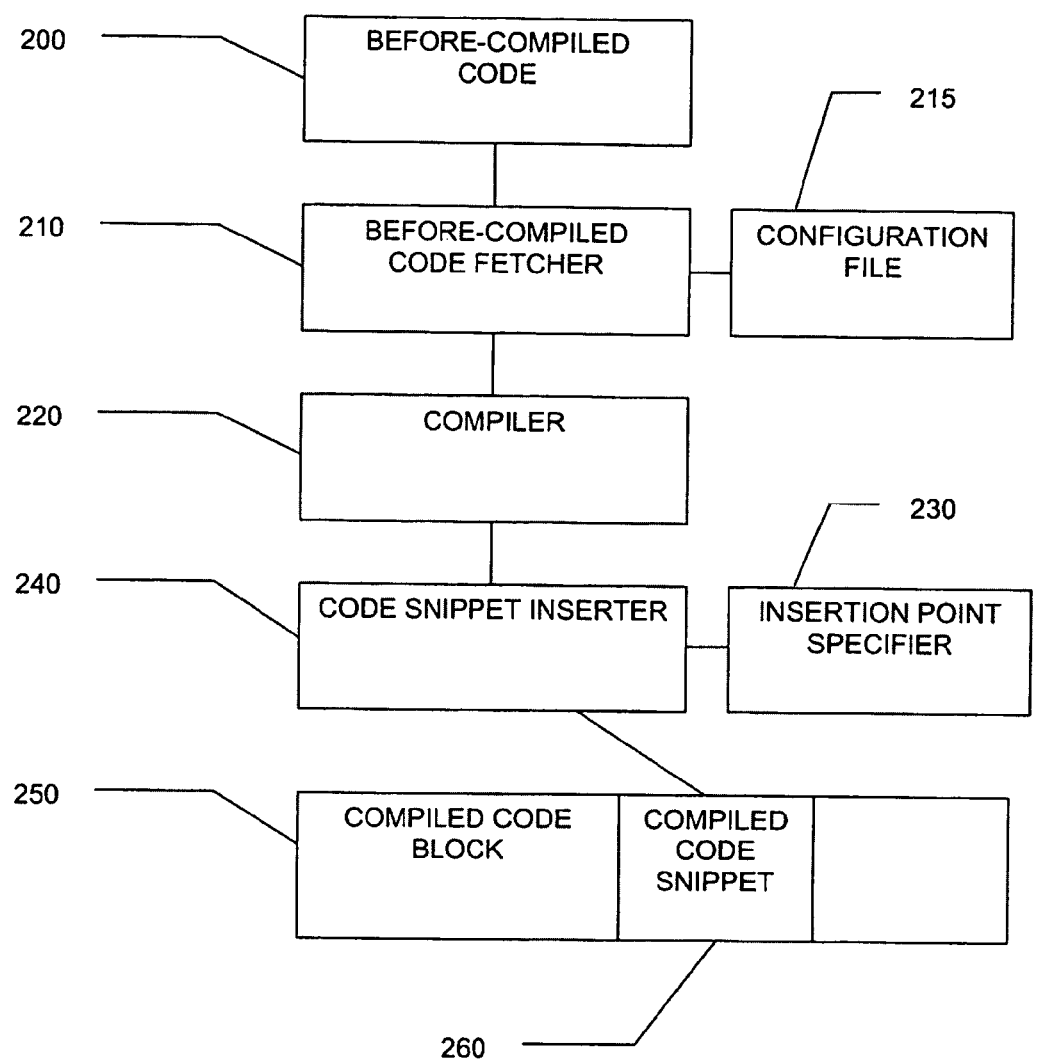
FIG. 2 is a block diagram showing a system for inserting a compiled code snippet into a compiled code block at a specified insertion point, in accordance with an illustrative implementation of the claimed invention.

Referring now to FIG. 2, shown is a block diagram illustrating a system for inserting a compiled code snippet into a compiled code block at a specified insertion point. Before-compiled code is provided (200), such as in a file. The before-compiled code can comprise, for example, lines of high-level computer code. The before-compiled code is fetched by a code fetcher (210), in accordance with instructions contained, for example, in a configuration file (215). In one embodiment, the configuration file can also comprise the before-compiled code. The code fetcher retrieves the before-compiled code, and provides it to a compiler (220), where it is compiled into a compiled code snippet, comprising, for example, bytecode or native code. An insertion point specifier (230) specifies an insertion point in a compiled code block of an application or application class (250), at which to insert the compiled code snippet. The configuration file (215) can comprise the insertion point specifier. A code snippet inserter (240) inserts the compiled code snippet (260) into the compiled code block (250) of the application or application class at the insertion point specified by the insertion point specifier (230). Thereby, the application or application class is modified during runtime.

Illustratively, the ability to specify arbitrary Java code that can be compiled into bytecode and inserted into application classes at runtime can provide the ability to change the data being captured on-site by a Java probe, without any costly or time-prohibitive product changes. A few lines of Java code can add the same functionality as provided in the prior art by several full java classes to manually affect bytecode instrumentation. In addition, users can also add their own variables for use later in the code snippet.

In an exemplary implementation, different users of the compiler can provide their own pre-set variables for use by a snippet. Appropriate type checking and exception handling can also be added around the code snippet so that any mistakes in the snippet will not cause any behavior changes in either the Java probe or the application being probed.

In an exemplary implementation, the Java language syntax supported by the code snippet compiler is a subset of the full Java language to ensure that the added code snippet can be inserted into an application safely. This can result in benefits with regard to the complexities involved around operand stack management, exception handling, and runtime type identification.

In an exemplary implementation, the code snippet compiler can support casting various variables, i.e., changing the variable type if needed. The snippet compiler can also support return values in the snippet, such as to aid the compiler in identifying the runtime type to use when generating the bytecode. The casting mechanism can assist the compiler in identifying the proper bytecodes to use. The casting mechanism can also help avoid the use of reflection, which can cause undesirable runtime performance overhead.

Advantages of the use of Java code snippets over the prior art can include the ability to write only a few lines of Java code whereby the compiler will automatically compile them to bytecode and insert the bytecode in the proper location in an already compiled block of bytecode.

Additional advantages of using code snippets in accordance with the claims can include one or more of the following, especially when used in conjunction with a Java-based application. There can be less processing overhead than prior art practices, for example, in instrumentation. In addition, the Java Reflection API need not be used to call arbitrary methods in application code as required in prior art practices. Furthermore, the code snippet can be just-in-time (JIT) compiled to bytecode upon the first invocation of the application class into which the code snippet is inserted. In this way, the code snippet can be incorporated into the class as fast as the class invocation can be made, effectively as though the code snippet had been included in the original class. Furthermore, the Java Runtime's JIT compiler can further compile the Java bytecode to machine instructions, thereby making the code snippet optimal speed for all practical purposes.

An additional benefit of using code snippets is that it can make ordinary application code easier to maintain. For example, instead of having many classes, such as Java application classes, to write, test, and maintain fewer lines of code can be used in conjunction with pre-built code snippets. Furthermore, vendor maintenance may not be necessary for any user-written code snippets.

Code snippets can also provide a way for a Java probe to obtain access to data that it is isolated from due to complex ClassLoader issues. For example, if only prior art practices are used, the Java probe cannot make API calls directly to objects loaded in other ClassLoaders.

Code snippets can be secured to control deployment and prevent mis-use of the snippet capabilities. For example, since code snippets can call arbitrary application code, an extra level of security may be desired in order to control how they are used. In an exemplary implementation, security can be provided to prevent remote modification of code snippets, and/or to lock the permissions on files associated with code snippets to only those who have permissions to change or create code snippets. In addition, or alternatively, a security hash can be used to validate that the code snippet being compiled is the same code snippet written by the author, without any changes.

Illustrative Example

Presented below is an illustrative example of a code snippet compiler package. The example is for use in conjunction with an application written in Java, although other implementations are possible. The Java Compiler Compiler (JavaCC) is a parser generator for use with Java applications. A parser generator is a tool that reads a computer programming language grammar specification and converts it to a parser program that can recognize matches to the grammar. Parsing transforms input text into a data structure, usually a tree, which is suitable for further processing by a compiler, and which captures the implied hierarchy of the input. In addition to the parser generator itself, JavaCC provides other standard capabilities related to parser generation such as tree building (via a tool called JJTree included with JavaCC), actions, and debugging. In the illustrative example, the package can hold the JavaCC/JJTree grammar for parsing uncompiled code snippets (the CodeSnippet.jjt), and can hold the Java code necessary to generate bytecode for such uncompiled code snippets (such as CodeSnippetCompiler, and the node classes).

Illustratively, at the outset a user of the code snippet compiler should provide a snippet of uncompiled code, such as lines of Java code, and have a very good idea about what to leave on the stack, as well as how to access various variables with regard to the information desired. In the following illustrative example of a code snippet, the code can leave a String on the stack, and only the default Java behavior is supported for variables and runtime handling.

```
CodeSnippetCompiler capture = new
CodeSnippetCompiler(code);
Delegate delegate =
    new CodeSnippetCompiler.CalleeImpl(factory, mg, this) {
        public boolean handleRuntimeError(InstructionList 1) {
            return false; // Nope, you deal with it.
        }
        public boolean consumeRuntimeError(InstructionList 1) {
            return false; // Put it to stderr!
        }
    };
InstructionList argList =
    capture.generateCode(delegate, new Type[ ] { Type.STRING
});
```

Reflection is a process by which a computer program can be self-adjusting in a manner that depends on its runtime environment. Normally, if reflection is not implemented, information about the structure of the program is lost as lower level code is produced when the program is compiled. However, if a program supports reflection, information about program structure can be preserved as metadata produced with the emitted code when the program is compiled, and can be used if needed. Thus, reflection can be used to adapt a program dynamically to different situations. Although other implementations are possible, in this illustrative example, the compiler can use Java Reflection at runtime to determine variables' type information, which is required for method calls and static fields. However, it is appreciated that this information could alternatively be specified in the configuration file without the use of Reflection.

Grammar

In this illustrative example, the supported grammar is a simplified subset of Java syntax, although other implementations are possible:
Literals
String: "a string"
boolean: true, false
integer: 42
null constant: null String Concatenation
"a string"+"another string"
"a string"+42
"Local" Variables Illustratively, a code snippet can gain access to objects in its immediate environment. As an example, if the code snippet is to be placed inside a method, there can be provided a straightforward way to refer to "the first argument" in the method. Following are the illustrative default supported variable references, although other implementations are possible:

callee—This refers to the callee object for an instance method. It is not currently valid to use #callee in a static method.

arg1, #arg2, . . . , #argN—This will refer to the associated argument to the callee method call.

Java's Object class provides a method called toString( ) that returns the string representation of the object on which it is called. Illustratively, if an object reference is left by itself on the operand stack, the snippet can automatically call toString( ) on that reference if appropriate to do so. In this example implementation, whether it does so depends on what the instrumentation expects on the stack. Different instrumentation points may support their own particular variable references. Illustratively, for this example, the CLApplicationDiscoveryPoint supports a #classloader variable. A class loader is an object that is responsible for finding and loading class files at run time. In general, a Java program runs on a platform-independent Java virtual machine (JVM). A Java program is not a single executable file, but instead is composed of many individual class files, each of which corresponds to a single Java class. The class files are not loaded into memory all at once, but rather are loaded on demand, as needed by the program. The class loader is the part of the Java virtual machine (JVM) that loads classes into memory.

Instance Fields

In this example, code snippets can support accessing instance fields of object references, just like normal Java syntax, although other implementations are possible:

arg1.field
arg1.field.getSomething( )

Illustratively, the field may or may not be accessible, depending on the access level of the field, and where it is in the code structure in relation to the bytecode being instrumented. For example, attempting to access a private field of a different class may not work. In this example implementation, the code snippet compiler can log a warning when this is encountered, with instructions to guide the user to a solution to the problem, such as adding another special instrumentation point:

```
[makepublic]
keyword = makepublic
class = <class name>
fields = <field name>, <field name>, ...
methods = <method name>, <method name>, ...
```

Class References and Static Variables

Illustratively, if a code snippet compiler uses code statements that do not conform to the normal programming language syntax, a standard compiler may not be able to properly analyze the code statements and parse them properly. Although other implementations are possible, a solution to this problem can be to surround the class with some type of marker for the parser to get a hold of, to identify the class to the code snippet compiler. For example, the "@" character can be used to surround the class:

```
@java.lang.System@
@java.lang.System@out (Static field)
```

Casting

Type casting refers to changing an entity of one data type into another. This can be done, for example, to take advantage of certain features of type hierarchies. For instance, values from a more limited set, such as integers, can be converted to a different format for enabling operations not previously possible, such as division with several decimal places' worth of accuracy. In this example implementation, casting can be supported on object references, although other implementations are possible:

```
#arg1<some.class.Here>.doSomething( )
@some.class.Foo@foo<some.class.Here>.doSomething( )
#foo = #arg1<Bar>.b( );
#foo<java.lang.Object>.toString( );
```

Illustratively, this creates the following Java equivalent:

```
((some.class.Here)arg1).doSomething( )
((some.class.Here)some.class.Foo.foo).doSomething( )
String foo = ((Bar)arg1).b( );   ((Object)foo).toString( );
```

Illustratively, casting may not be supported for special types such as #classloader.

Method Calls

In this example implementation, method calls, with or without arguments, and method chaining, can all be supported:

```
#arg1.toString( )
#arg2.getSomething( ).getSomethingElse( )
#callee.getSomething("foo", #arg1).somethingElse( )
@some.Class@.staticMethod( )
```

In this example implementation, note the dot still needs to appear after the static reference for the method call to be parsed properly.

@java.lang.System@out.println("Here I am!")

Although other implementations are possible, in this example implementation, to speed up the generation of bytecode at runtime (by avoiding reflection), what type is returned can be specified from a method by using the following:

arg1.getSomething( )<some.class.Here>

However, this may not be helpful if the method takes arguments, or a static field is used.

Although other implementations are possible, in this example implementation, the ability to specify the type of method arguments, whether the method is INVOKESTATIC vs. INVOKEVIRTUAL, and the type of a static variable, can also be added.

Multiple Statements

Although other implementations are possible, in this example implementation, some instrumentation (such as CLApplicationDiscoveryPoint) will expect multiple objects left on the stack. Illustratively, even if the instrumentation does not expect multiple objects, it can be convenient to support multiple statements in a single code snippet:

```
@java.lang.System@out.println("Look out!");
#arg2.getSomething( );
```

Variable Assignment

Although other implementations are possible, in this example implementation, in addition to the default supported "local" variables, users can create their own.

```
#foo = #arg1.getFoo( );
@java.lang.System@out.println("Foo: "+ #foo);
#arg2.getSomething(#foo);
```

Conditional Expressions

This example implementation can include the following features, although other implementations are possible: Conditional expressions can be supported in a limited way; the evaluation operands can be limited to literals and object references; the operators can be limited to equals and not equals; in this example implementation, conditionals must be enclosed by parenthesis; true/false statements must evaluate to exactly the same type, or be null; and, toString( ) is not automatically called on the true/false statements. Illustratively, in the example below, getSomething( ) must return a String in order to be valid. Otherwise, the snippet can use #arg1.getSomething( ).toString( ).
(null==#arg1?"Unknown": #arg1.getSomething( ))

Although other implementations are possible, in this exemplary implementation, conditional statements can also be nested.

Illustrative Comparison

Following is an illustrative example of a code snippet, and a prior art solution using Reflection to achieve the same result. The example code snippet can be compiled once, and can execute much faster than the prior art Reflection counterpart.

Code Snippet:

```
#config = #callee.getPortletConfig( );\
#locale = (#arg1 == null ? null : #arg1.getLocale( ));\
#bundle = (#config == null ? null : (#locale == null ? null :
#config.getResourceBundle(#locale)));\
#title = (#bundle == null ? "Unknown" :
#bundle.getString("javax.portlet.title"));\
#name = (#config == null ? "Unknown" : #config.getPortletName( ));\
#name + "-" + #title;
```

Prior Art Reflection Solution:

```
/**
 * Utility method to call the given method with signature and args from
 * the given object.
 *
 * @param object Object to use to call the method
 * @param methodName Method to call
 * @param signature Signature of the method
 * @param methodArgs Arguments to use
 * @return the result of the method call
 * @throws NoSuchMethodException
 * @throws IllegalAccessException
 * @throws InvocationTargetException
 */
protected Object callMethod(Object object, String methodName, Class[ ]
signature, Object[ ] methodArgs, boolean useDeclaredMethod)
    throws NoSuchMethodException, IllegalAccessException,
```

-continued

```
InvocationTargetException {
    Class classKey = object.getClass( );
    Method method = null;
    OpenIntObjectHashMap methodMap = null;
    // Java 1.3's Reflection method lookup is HIDEOUSLY slow. Do our
own caching, even though it requires a synchronization it's
    // still going to be faster
    synchronized (portletMethodsCache) {
        metricPortletMethodCacheLookups.increment( );
        methodMap =
            (OpenIntObjectHashMap)portletMethodsCache.get(classKey);
        // Class entry doesn't exist, so the method won't either
        if (methodMap == null) {
            metricPortletMethodCacheL1Misses.increment( );
            if (useDeclaredMethod) {
                method = classKey.getDeclaredMethod(methodName, signature);
            }
            else {
                method = classKey.getMethod(methodName, signature);
            }
            method.setAccessible(true);
            methodMap = new
OpenIntObjectHashMap(OverridableHashMap.-
DEFAULT_INITIAL_CAPACITY);
            methodMap.put(methodName.hashCode( ), method);
            portletMethodsCache.put(classKey, methodMap);
        }
    }
    // The methodMap was found, otherwise we would have hit the block
    // above and fetched the Method there.
    if (null == method) {
        synchronized (methodMap) {
            method = (Method)methodMap.get(methodName.hashcode( ));
            // This particular method isn't in our method map
            if (method == null) {
                metricPortletMethodCacheL2Misses.increment( );
                if (useDeclaredMethod) {
                    method = classKey.getDeclaredMethod(methodName, signature);
                }
                else {
                    method = classKey.getMethod(methodName, signature);
                }
                method.setAccessible(true);
                methodMap.put(methodName.hashCode( ), method);
            }
        }
    }
    return method.invoke(object, methodArgs);
}
public String getTokenValText(Object genericPortlet, IMethodSignature
args, int whichArg, String token) {
    Object request = getArg(genericPortlet, args, whichArg);
    try {
        // PortletConfig config = portlet.getPortletConfig( );
        Object config = callMethod(genericPortlet, "getPortletConfig",
new Class[0], null);
        // String portletName = config.getPortletName( );
        Object portletName = callMethod(config, "getPortletName",
new Class[0], null);
        // Locale locale = config.getLocale( );
        Object locale = callMethod(request, "getLocale", new Class[0], null);
        // get the resource bundle to extract the displayed title
        Class[ ] getResourceSig = { locale.getClass( ) };
        Object[ ] getResourceArgs = { locale };
        // ResourceBundle resourceBundle = config.getResourceBundle(locale);
        Object resourceBundle = callMethod(config, "getResourceBundle",
getResourceSig, getResourceArgs);
        Class[ ] getStringSig = { String.class };
        Object[ ] getStringArgs = { "javax.portlet.title" };
        // String portletTitle = resourceBundle.getString("javax.portlet.title");
        Object portletTitle = callMethod(resourceBundle, "getString",
getStringSig, getStringArgs);
        return portletName + "-" + portletTitle;
    }
    catch (Exception e) {
        LoggerManager.warning(JSR168PortletContextManager.class,
            "Error getting token values from object: " +
genericPortlet.getClass( ).getName( ), e);
```

-continued

```
    return null;
  }
}
```

Various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of modifying the functionality of a diagnostic probe as the diagnostic probe is running, the method comprising:
   providing before-compiled computer code;
   compiling the before-compiled code into a compiled code snippet;
   specifying an insertion point in a compiled code block of the diagnostic probe; and
   inserting the compiled code snippet into the compiled code block at the specified insertion point while the diagnostic probe is running, wherein the compiled code snippet modifies the behavior of the diagnostic probe.

2. The method of claim 1, wherein the diagnostic probe monitors the functionality of a separate running computer application.

3. The method of claim 1, wherein the compiler forms part of the diagnostic probe.

4. The method of claim 1, wherein the before-compiled code comprises high-level computer code, and the compiled code block and the compiled code snippet comprise compiled high-level computer code.

5. The method of claim 4, wherein the high-level computer code comprises Java source code, and the compiled code block and the compiled code snippet comprise bytecode that runs on a Java Virtual Machine.

6. The method of claim 5, wherein the compiled code block is part of a Java application class.

7. The method of claim 1, wherein the before-compiled computer code is provided in a configuration file, the method further comprising fetching the before-compiled computer code prior to compiling the before-compiled code.

8. A computer readable medium having computer readable instructions to instruct a computer system running a Java-based application to perform a method comprising:
   providing before-compiled computer code;
   compiling the before-compiled code into a compiled code snippet;
   specifying an insertion point in a compiled code block of a diagnostic probe; and
   inserting the compiled code snippet into the compiled code block at the specified insertion point while the diagnostic probe is running, wherein the compiled code snippet modifies the behavior of the diagnostic probe.

9. The computer readable medium of claim 8, wherein the method further comprises fetching the before-compiled computer code.

10. A system for modifying the functionality of a diagnostic probe as the diagnostic probe is running, the system comprising:
    a before-compiled code fetcher for fetching before-compiled computer code;
    a compiler for generating a compiled code snippet from the fetched before-compiled code;
    an insertion point specifier for specifying an insertion point at which to insert the compiled code snippet in a compiled code block of a diagnostic probe; and
    a code snippet inserter for inserting the compiled code snippet into the compiled code block at the specified insertion point while the diagnostic probe is running, wherein the compiled code snippet modifies the behavior of the diagnostic probe.

11. The system of claim 10, wherein the diagnostic probe monitors the functionality of a separate running computer application.

12. The system of claim 10, wherein the compiled code snippet adds select functionality to the diagnostic probe.

13. The system of claim 10, wherein the compiler forms part of the diagnostic probe.

14. The system of claim 10, wherein the before-compiled code comprises high-level computer code, and the compiled code block and the compiled code snippet comprise compiled high-level computer code.

15. The system of claim 14, wherein the high-level computer code comprises Java source code, and the compiled code block and the compiled code snippet comprise bytecode that runs on a Java Virtual Machine.

16. The system of claim 15, wherein the compiled code block is part of a Java application class.

* * * * *